United States Patent [19]

Matchette

[11] 4,317,400
[45] Mar. 2, 1982

[54] SAW GUIDE CLAMPING ASSEMBLY

[76] Inventor: Gerald J. Matchette, 3339 - 236 St., Langley, British Columbia, Canada, V3A 4P6

[21] Appl. No.: 173,280

[22] Filed: Jul. 29, 1980

Related U.S. Application Data

[63] Continuation-in-part of Ser. No. 884,609, Mar. 8, 1978, Pat. No. 4,231,274.

[51] Int. Cl.³ .................. B23D 55/08; B27B 13/10
[52] U.S. Cl. .................................. 83/820; 83/821; 83/829; 279/34; 279/41 R
[58] Field of Search ................. 83/820, 821, 829; 279/34, 41

[56] References Cited

U.S. PATENT DOCUMENTS

| | | | |
|---|---|---|---|
| 85,329 | 12/1868 | Reid | 279/41 X |
| 607,931 | 7/1898 | Hoyt | 83/820 |
| 3,363,083 | 1/1968 | O'Conner | 279/34 X |
| 4,085,636 | 4/1978 | Eklund | 83/820 |

Primary Examiner—Donald R. Schran
Attorney, Agent, or Firm—Carver & Co.

[57] ABSTRACT

A clamping assembly for clamping a block of wearable material for guiding a band saw blade to maintain the blade in alignment at a working station. The block of wearable material is formed with a dovetail adjacent a rear face remote from the wearing face of the block, and the clamping assembly includes clamping elements having inclined surfaces mating with the inclined surfaces of the dovetail to provide clamping and gripping forces and inwardly directed drawing forces on the block. The clamping elements are separated in the clamping region by a gap permitting them to be drawn towards one another and thereby to exert a clamping force on the dovetail of the block of wearable material. The clamping elements are dimensioned so that one element behaves as a cantilever spaced from the other element, which thereby maintains a fixed relationship with a supporting datum surface.

11 Claims, 7 Drawing Figures

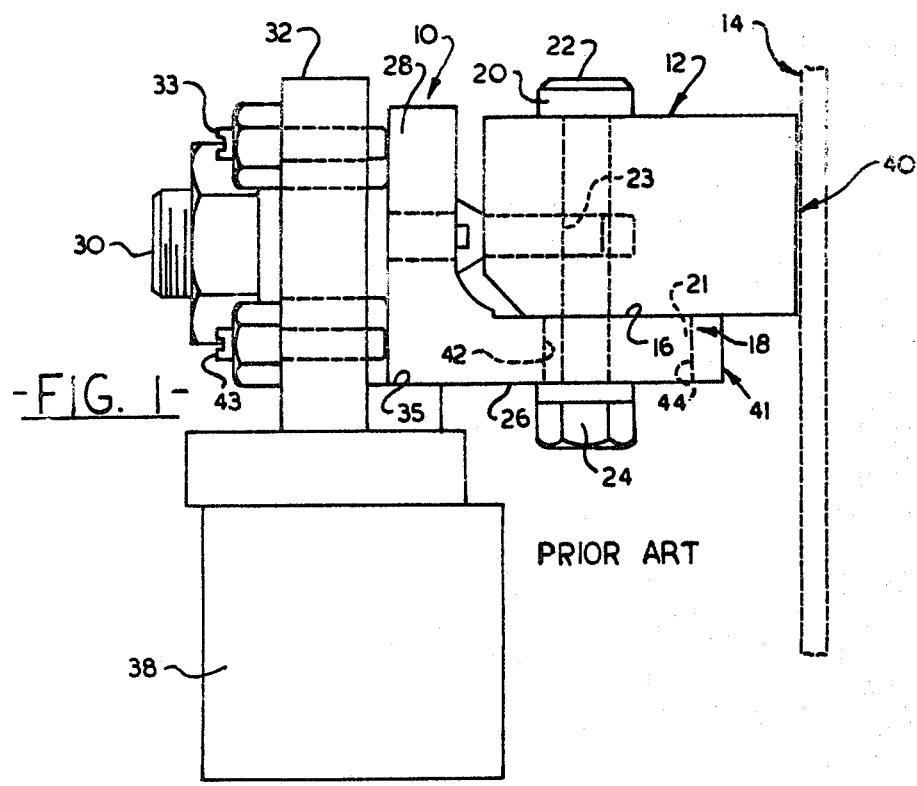
-FIG. 1- PRIOR ART
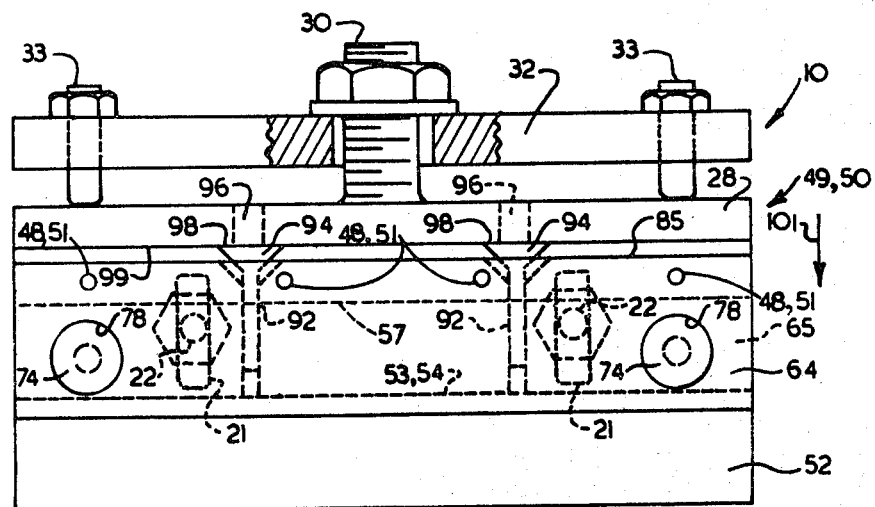
-FIG. 2-
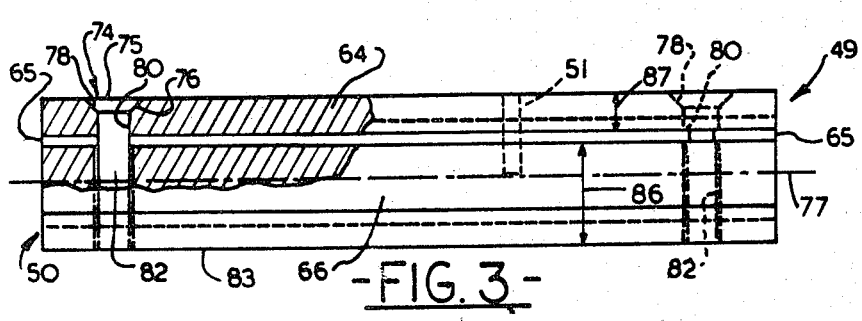
-FIG. 3-

SAW GUIDE CLAMPING ASSEMBLY

CROSS REFERENCE TO OTHER APPLICATIONS

This is a continuation-in-part of my copending application Ser. No. 884,609 filed Mar. 8, 1978, now U.S. Pat. No. 4,231,274, entitled SAW GUIDE ASSEMBLY.

BACKGROUND OF THE INVENTION

1. Field of the Invention

This invention relates to a clamping assembly for clamping a block of wearable material.

2. Prior Art

Blocks of wearable but wear-resisting material, for example reinforced phenolic resin, are utilized in sliding engagement with band saw blades or other moving metal parts, the blocks of wearable material acting as guides for maintaining alignment of the moving metal part for accurate cutting or the like. Conventionally, the block of wearable material is maintained in a holding means against a datum surface to maintain proper alignment of the block, and as the block wears adjustment means are provided to accomodate the wear. Some early holding and adjustment means had screws to advance the block towards the saw, after advancement the wear face of the block being "dressed" to provide an accurate wear face. This was time consuming and resulted in excessive saw "down time" as the saw could not operate whilst the blocks were being dressed or adjusted. A "quick change" saw guide assembly was developed which reduced saw down time appreciably by providing a quickly releasable holding structure which can be fitted to the saw with one nut and bolt or other means and yet holds a wear block accurately in a required position with no further adjustment being required until the block was worn beyond predetermined limits. The assembly was then removed and another block and holding structure substituted whilst the worn block was adjusted and re-faced for replacement. One type of quick change saw guide assembly has an upper clamping piece disposed oppositely to the datum surface, both of which overlap a substantial portion of the wearable block. Sometimes more than fifty percent of the volume of the block is necessarily located between opposed holding surfaces of the holding means and thus is unavailable for consumption by wear against the band saw blade or other moving metal element. This means that as the block wears down towards the block portion located between the opposed holding surfaces, eventually a point is reached where perhaps something of the order of fifty percent or more of the block remains intact, at which point no further consumption of the block is possible and it must thereafter be discarded and replaced by a fresh block. This results in considerable waste of the wearable material, which is often fairly costly.

SUMMARY OF THE INVENTION

The invention reduces some of the difficulties and disadvantages of the prior art by providing a clamping assembly for clamping a block of wearable material for retaining the assembly and wear block concurrently in an existing wear block holding means. The clamping assembly serves as a substitute for that portion of the prior art wear block that remains after normal consumption of the block, and clamps on only a relatively small portion of the wearable material so that the block and assembly is securely retained in a common holding means, yet most of the volume of the block may be consumed while remaining thus clamped.

A clamping assembly according to the invention is adapted for clamping a guide block of wearable material therein, the block having first and second engaging surfaces adjacent an inner face thereof. The block has an outer face remote from the inner face to serve as a wearing surface to bear against a wearing element of a machine, such as a band saw. The clamping assembly and block are received in a holding means of the machine for location adjacent a datum surface and can be directly substituted for a prior art guide block. The clamping assembly is characterized by a first clamping element having front and rear portions, the front portion having a first bearing and gripping surface for engaging the first engaging surface of the block. The assembly also includes a second clamping element having front and rear portions, the front portion having a second bearing and gripping surface for engaging the second engaging surface of the block. The assembly further includes spacer means, complementary alignment means and clamp means. The spacer means cooperate with the respective rear portions of the first and second clamping elements to maintain a gap between portions of the clamping elements. The alignment means is adjacent the spacer means and cooperates with the first and second clamping elements to maintain the clamping elements in alignment with each other and with the block. The clamp means is disposed remotely from the spacer means and applies a clamping force to the clamping elements and thence to the block so that the force deflects the first clamping element toward the second clamping element to narrow the gap therebetween.

The clamping elements can be dowelled together, located by tongue and groove means or equivalents. The gap separating the two clamping elements is sufficiently large so that one of the clamping elements deflects slightly under the clamping force to provide a clamping pressure against the dovetail of the block.

Since it is desired not only to clamp the block but also to maintain an inwardly directed (ie. directed away from the wearing face) force on the block, which tends to stabilize the position of the block, it is desirable to have engaging surfaces of the block and the bearing and gripping surfaces of the clamping elements inclined so that the clamping force applied to the clamping elements is transformed into force components applying both the clamping force and an inwardly directed drawing force on the block relative to the clamping elements. Conveniently this can be accomplished by forming the inner face of the block remote from the wearing face as a dovetail section engaged by mating inclined opposed surfaces of the upper and lower clamping elements.

The guide block according to the invention for use as a saw guide has an outer face to serve as a wearing surface to bear against the saw blade and an inner face remote from the outer face. The block has engaging surfaces adjacent the inner face for gripping by the clamping assembly, two of the engaging surfaces being inclined to each other to form a dovetail section when viewed within a plane perpendicular to the wearing face of the block.

In the detailed description and in the accompanying claims, a particular orientation of the block whereby the datum surface is a generally horizontal lower surface will be assumed. However, the terms "vertical", "horizontal", "upper", "lower", "inward", "outward" and the like should be construed in a relative rather than an absolute sense, since it will be apparent that the orientation of the block and of the clamping elements may be varied to suit particular applications.

A detailed disclosure following, related to drawings, describes a preferred embodiment of the invention which is capable of expression in structure other than that particularly described and illustrated.

DESCRIPTION OF THE DRAWINGS

FIG. 1 is a side elevation of a typical prior art quick change wear block holding means for holding a block of wearable material, FIG. 2 is a simplified fragmented top plan of a clamping assembly according to the invention shown fitted to an existing holding means and shown holding a block according to the invention, FIG. 3 is a fragmented front elevation of a clamping means, the wear block being removed.

DETAILED DISCLOSURE

FIG. 1 (Prior Art)

Figure 4:
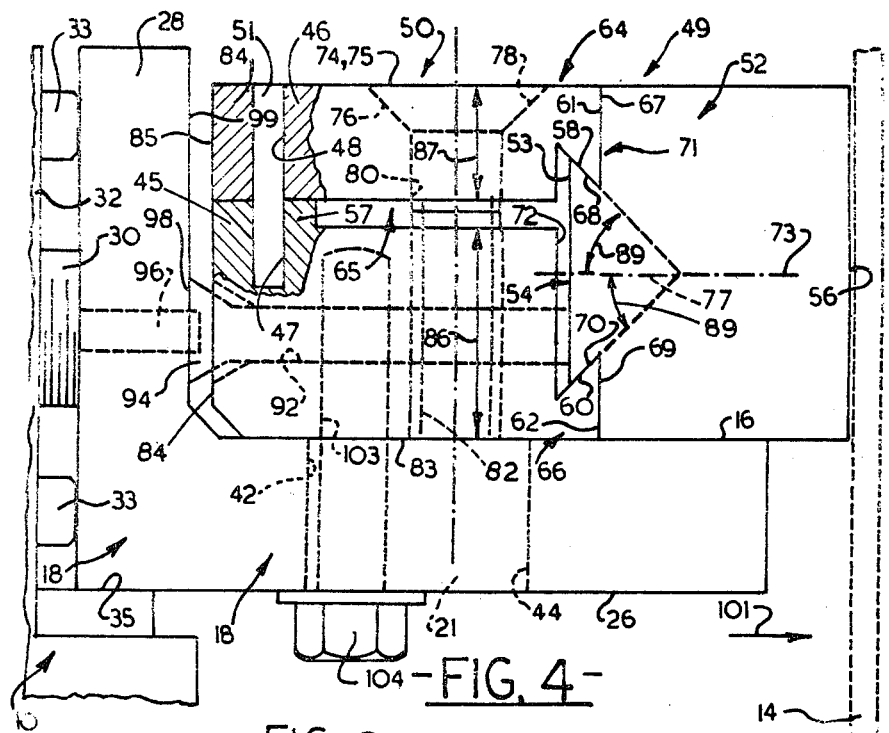
FIG. 4 is a simplified fragmented side elevation of a clamping assembly according to the invention shown fitted to the existing holding means and holding the block according to the invention.

A conventional quick change guide block holding means 10 clamps a wear-resistant wearable guide block 12 for guiding and maintaining in alignment a band saw blade 14 or similar moving metal element, shown at a datum position. The block 12 may be made of any suitable known saw guide material such as a phenolic resin or lignum vitae. The block 12 is a generally rectangular block and is clamped between a machine datum surface 16 of an L-sectioned clamp support element 18 and upper clamping elements 20. Two laterally spaced clamping screws 22, one only being shown, pass through clearance passages 23 in the block and elongated slots 21 in an offset portion of the support element 18. Each screw 22 has a head 24 bearing against a lower surface 26 of the support element 18 with an upper end threaded in the respective element 20. The support element 18 is provided with a vertical flanged portion 28 from which a main retaining screw 30 extends and passes through a clearance opening in a main post 32 to permit quick connection of the support element 18 to the post. Four adjustable set screws 33, two only being shown in FIG. 1, threadedly engage the main post 32 which is securely fixed to a mounting support 38 fixed to the band saw frame, not shown. The screws 33 are spaced at corners of the portion 28 and can be individually adjusted and then locked so that ends thereof locate the portion 28 at the required inclination. The screws 33 provide fine adjustment of the position and location of support element 18 so that the saw blade can be accurately aligned to the saw line datum as will be described. It is seen that the screw 30 draws the support 18 against ends of the set screws 33 and the lower surface 26 of the element 18 rests on a complementary lower datum face 35.

The block 12 has an outer wearing face 40 which bears against the saw blade 14, and after a time this face wears and is consumed, thus necessitating advancing the block so that the wear face is repositioned relative to the saw datum. In the early days of this trade, ie. before quick change wear blocks were introduced, the saw would be stopped and the block would be unclamped and the wear face of the block filed to re-establish an accurate wearing face. Usually a replacement block with a re-filed face would then be replaced in a new position, and, after fine adjustment the re-filed face would be accurately positioned relative to the saw datum for further use. This method was time consuming and resulted in excessive down time of the saw and the "quick change" saw guide concept was introduced which forms no part of this invention. The invention can be used with the older prior art holding means, or with most of the newer quick change types, one of which is illustrated in FIG. 1. With the quick change concept, as wear occurs the block and support element are removed as a unit from the machine and replaced with a remachined block and a replacement element 18. Remote from the saw, the worn wear block is then incrementally advanced relative to the support element 18 for remachining in accurate jigs, not shown. When the block has been remachined it can be refitted in the saw, the support element 18 being again accurately held against the four set screws 33 and quickly re-clamped to the post 32 by the main screw 30. The lower datum face 35 engages the lower surface 26 to establish a horizontal datum which resists downward forces on the element 18 arising from the saw bearing against the block. Thus the element 18 is initially accurately set up using the set screws 33 and once this is established for a particular jig, after remachining of the block, good repeatability of position is attained and further adjustment of the set screws is unnecessary.

As the outer wearing face 40 of the block 12 is worn down and consumed, to accomodate the incremental advance of the block 12 outwardly toward the saw blade 14, ie. away from the portion 28, the clamping screws 22 are received in the respective elongated slots 21 in the support 18, each slot having an inner limit 42 and an outer limit 44. The slots permit the screws 22 to move inwardly and outwardly relative to the flanged portion 28 within the limits 42 and 44 whilst restricting lateral movement of the screw 22.

As the block 12 is advanced, the outer limit 44 is finally reached beyond which there is insufficient guide block material remaining to permit clamping. When the screws 22 bear against the outer limit 44 of the slots, in effect the useful life of the block has ended because it is necessary that the element 18, or clamping element 20, whichever is the closest to the saw blade 14, should not make contact with the saw blade. Thus there is considerable waste in utilizing the conventional clamping assembly of FIG. 1 since about half the volume of the block 12 as originally made is not consumable for purpose intended.

FIGS. 2 through 4

A novel guide block assembly 49 has a clamping assembly 50 according to the present invention, and is used with a relatively simple and ingenious modification of the prior art wear block that reduces considerably the above waste of guide block material. In fact, by selection of certain dimensions the assembly 50 can use remachined rejected guide blocks from prior art holding means, thus reducing waste by recycling previously unusable wear block material. The assembly 50 can grip a guide block 52 of wearable material which is provided with a dovetail 54 adjacent an inner surface 53 thereof remote from an outer wearing face 56 of the block 52. The dovetail 54 includes vertically oppositely disposed obliquely inclined engaging surfaces 58 and 60, coplanar outer surfaces 61 and 62 and the inner surface 53. The surfaces 53, 61 and 62 are generally parallel to the wearing face 56. The engaging surfaces are spaced apart and inclined to each other to form a dovetail section when viewed endwise of the block and within a plane perpendicular to the wearing face of the block.

The clamping assembly 50 includes discrete first and second clamping elements 64 and 66, mid portions of opposed faces of the clamping elements being spaced apart by gap 65 extending axially along the length of the assembly. The first and second clamping elements 64 and 66 have at respective front portions thereof inclined first and second gripping and bearing surfaces 68 and 70 which engage, clamp and grip the corresponding first and second inclined engaging surfaces 58 and 60 respectively of the dovetail 54 of the block 52. The surfaces 68 and 70 are disposed on opposite sides of, and as viewed in FIG. 3, parallel, to a clamp axis 77. The second element has an axially extending projection or step 57 adjacent a rear portion 45 thereof which contacts an adjacent rear portion 46 of the first clamping element, the projection having a depth to provide the gap 65 between the elements. The rear portions 45 and 46 of the clamping elements have four spaced parallel passages 47 and 48 respectively, the passages 47 being positioned so as to be aligned with the passages 48 of the portion 46. Dowels 51 are located in the passages 47 and 48 to locate the clamping elements in desired relationship. The complementary dowels and passages are spaced along the rear portions of the clamping elements. The projection 57 serves as a spacer means cooperating with the respective rear portions of the first and second clamping elements to maintain the gap 65 between the mid portions of clamping elements. The dowels 51 serve as complementary alignment means adjacent the spacer means and cooperating with the first and second clamping elements to maintain the clamping elements in alignment with each other and the block 52. Clearly at least two dowels or equivalents are required to maintain the alignment.

The assembly 50 has coplanar outer datum faces 67 and 69 which intersect the surfaces 68 and 70 respectively to form inwardly facing "vee" shaped teeth which form a dovetail clamp 71 complementary to the dovetail 54 of the block. The clamp 71 has a dovetail central axis 73 disposed normally to the wearing face 56 of the block and essentially coincident with the clamp axis 77. The clamp has a front face 72 adjacent front portions of the clamping elements and extending between the teeth, the face 72 being spaced from the inner surface 53 of the block to prevent interference therewith.

The assembly 50 includes a pair of similar laterally spaced pinch screws 74, each screw having a respective head 75 with a conical lower surface 76 engaging a complementary countersunk recess 78 in the first clamping element 64. Each screw passes freely through a respective clearance passage 80 in the clamping element 64 and has an outer threaded portion 82 screwed into the lower clamping element 66. It can be seen that the pinch screws are disposed remotely from the projection 57 and thus are between the spacer means and the gripping and bearing surfaces 68 and 70 so that tightening the pinch screws 74 narrows the gap 65 and draws the outer ends of the elements 64 and 66 towards each other, thus clamping the dovetail 54 therebetween. The pinch screws serve as clamp means disposed remotely from the spacer means for applying clamping force to the clamping elements and thence to the block. Equivalent means can be substituted.

The second clamping element 66 has a lower surface 83 which rests on the horizontal machine datum surface 16 of the upper surface of the prior art support element 18. As seen in FIGS. 3 and 4, the second element 66 has a thickness 86 greater than thickness 87 of the first element 64, so that the gap 65 is positioned assymetrically relative to the clamping assembly. The second element is thus more stable than the first element and thus the face 83 is selected as a datum surface for the clamping assembly. Similarly, because a rear face 84 of the element 66 is larger than a rear face 85 of the element 64, the face 84 is selected as another datum surface of the assembly 50. Because there are likely to be small variations in the relative dimensions of the dovetail sections of different wear block, to accomodate these variations and wear, it is preferable that relevant datum surfaces of the clamping assembly are non-moving relative to each other irrespective of the degree of movement, within reasonable limits, of the clamping elements. The thicker lower clamping element 66 serves as an essentially non-changing base for the assembly and the lower surface 83 and the rear face 85 thereof cooperate with portions of the holding means 10 and thus serve as effectively stable datum faces. In effect, because the second element 66 is thicker than the first element 64, the first element 64 is considered to be effectively cantilevered relative to the second element by extending forwardly from the projection 57. Thus, the second element 66 remains fixed relative to the holding means 10 and the first element 64 is caused to move downwardly toward the second element 66 when the pinch screws 74 are tightened. The gap 65 need only be large enough to accomodate enough downward vertical deflection of the clamping element 64 to grip the dovetail 54 of block 52 sufficiently securely to prevent chatter or lateral sliding along the assembly. Thus the surface 83 serves as a primary datum face for locating the assembly relative to the sawing apparatus.

By providing the clearance between the inner surface 53 of the guide block 52 and the face 72 of the clamping assembly, a second aspect of the dovetail clamp can be utilized to maintain the block 52 in a stable position drawn against the outer datum faces 67 and 69 of the first and second clamping elements 64 and 66. When the pinch screws 74 are tightened, the surfaces 68 and 70 of teeth of the dovetail grip the block and a normal vertical squeeze force applied by screws 74 to the clamping elements is transformed by the inclined surfaces 58 and 60 of the block and the surfaces 68 and 70 of the clamping elements into an inward component tending to draw the dovetail 54 and thus the block 52 inwardly, ie. away from the saw blade 14 into intimate and stable contact with the outer datum faces 67 and 69 of the clamping elements 64 and 66 respectively, at least one of which serves as a secondary datum face to locate the block on the clamping surface. If the teeth of the clamp formed at the intersection of the faces 67 and 69 with the surfaces 68 and 70 are "blunt" to provide clearance so as not be cut into the block, accurate and rigid location of the block on the datum faces 67 and 69 is attained.

The bearing surfaces 68 and 70 of the dovetail clamp 71 are inclined at angles of inclination 89 of about 45 degrees to the axis 73. The angles could be dissimilar or varied from the illustrated angles, but the angles however should be selected so that the block 52 is readily insertable between the clamping elements. Also the surfaces of the clamping elements should be generally complementary to and mate with the inclined surfaces of the dovetail of the block so that the application of clamping force to the clamping elements by tightening the screws 74 clamps and draws the block without undue risk of shearing the dovetail away from the main body of the block. Angles of inclination of the dovetail surfaces of between about 5 and 60 degrees to the axis 73 are acceptable.

The guide block assembly 49 thus provides a structure that can be directly substituted for the existing prior art guide block 12 of FIG. 1 in an existing holding means. The guide block 12 is secured to the clamp support element 18 by the clamping screws 22, and advancing means, which are not annotated in FIG. 1, are provided to facilitate advancing of the guide block, when worn, relative to the flanged portion 28, prior to remachining. As the present guide block assembly 49 can be directly substituted for the prior art guide block 12, the clamping assembly 50 also has similar means for advancing the guide block assembly towards the saw. For completeness of disclosure this advancing means will now be described briefly by referring to FIGS. 2 and 4.

The rear face 84 of the second element 66 has a pair of spaced threaded parallel passages 92 to receive respective advancing screws 94 therein. The flange portion 28 has spaced passages 96 aligned with the passages 92, the passages 96 being sufficiently large to accept means to turn the screws 94, such as an Allen key. It can be seen that outer faces 98 of the heads of the advancing screws 94 are sufficiently larger than the passages 96 to bear against an inner face 99 of the flange portion such that, when the element 18 is removed from the machine, rotation of the screws 94 forces the block in direction of an arrow 101, ie. effectively towards the saw. The second clamping element 66 has a pair of threaded passages 103 to accept respective clamping bolts 104 therein, the passages and screws being equivalent to the passages 23 and screws 22 of FIG. 1. The slots 21 in the element 18 similarly permit advancing of the guide block assembly 49 towards the saw as the block 52 is consumed. Thus the guide block assembly 49 is now clamped onto the surface of the clamp support element 18 by the bolts 104. Contact between a lower surface of the guide block 52 and the lower surface 83 is likely when the guide block is new, but this is not important or required for support of the guide block.

Alternative holding and/or adjustment means for advancing, supporting or aligning of the block may be added or substituted as required. The present invention is not concerned with the details of holding or adjusting the clamping assembly and block, but only with the relative structures of the clamping elements 64 and 66 and their particular engagement with the block 52.

OPERATION

To fit the block 52 to the clamping assembly 50 initially, the screws 74 are loosened and the block 52 inserted axially into the assembly 50 and passing between the opposed surfaces 68 and 70 of upper and lower clamping elements 64 and 66. The dimensions of the dovetail 54 relative to the opposed surfaces 68 and 70 are selected to provide enough clearance to permit the block 52 to be inserted without too loose or too tight a fit. The screws 74 are then tightened, drawing the elements together to grip the block to form the guide block assembly 49. When the wear block 52 is fitted in the clamping assembly 50, the guide block assembly 49 is then treated as a one-piece item as regards the holding means 10. The assembly 49 is fitted to the support element 18 using the clamping bolts 104 similar to the prior art guide block, and there is little change in its use apart from considerable reduction in wasted material. The assembly 49 is moved incrementally toward the saw after each remachining of the wearing face 56. The block 52 is consumed almost to the outer datum faces 67 and 69 which, as can be seen in FIG. 4, leaves very little wear block material to throw away. When the block 52 is consumed, a new block can be fitted permitting indefinite use of the clamping assembly 50.

ALTERNATIVES AND EQUIVALENTS

The dovetails illustrated are substitutable by other configurations which accomodate the required clamping and gripping adjacent the inner face 53 of the block. An adequate clamping force tending to squeeze the block between the clamping elements is considered more important than the inwardly directed force drawing the block away from the saw because the block is forced outwardly by the saw, that is against the clamping assembly during normal operation of the device.

FIG. 5

A first alternative clamping assembly 106 has discrete first and second clamping elements 107 and 108 having similar dovetail section gripping and bearing surfaces adjacent front portions 109 and 110 thereof. The second clamping element 108 is thicker than the first element and has a tongue 112 projecting upwardly a height 118 from an upper surface 114 adjacent a rear portion 111 thereof and extending axially along the element. The first clamping element has a lower surface 113 provided with a groove 115 which is shallower than the height 118 and extends axially along a rear portion of the element 107 and is complementary to and accepts therein an upper portion of the tongue 112. The tongue and groove have relative sizes such that the element 107 is supported on the tongue 112 to extend therefrom and to form a gap 116 between the two elements, thus spacing the elements apart and also functioning essentially similarly to the dowels and passages of FIGS. 2 through 4. A pinch screw 117 extends between the two elements remotely from the tongue 112 and functions in the same manner as the screw 74 of FIGS. 2 through 4. The clamping elements 107 and 108 are thus maintained in alignment by the complementary tongue and groove which key the elements together and serve as the alignment means. Also mid portions of the elements are maintained spaced apart by the tongue 112, which thus serves as a spacer means, both means cooperating with rear portions of the elements. Note that the gap 116 is formed relative to the dovetail in a slightly different location from that illustrated in FIG. 3; the particular choice of dovetail arrangement and position of the gap relative thereto is not significant; considerable variation in design can be accomodated.

Figures 5, 7:
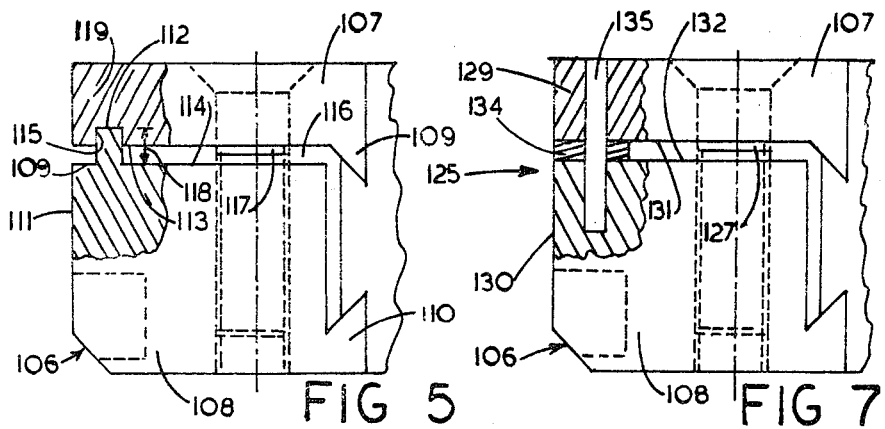
FIG. 5 is a simplified fragmented side elevation of an alternative clamping assembly.
FIG. 7 is a simplified fragmented side elevation of the the embodiment of FIG. 6.

It is seen that dowelled clamping elements, as shown in FIGS. 2 through 4, or the keyed together elements of FIG. 5, serve as alignment means, and other equivalent means can be substituted. Also, the spacer means results from relative sizes of the tongue and groove and clearly a shoulder or step similar to FIGS. 2 through 4 could be substituted so as to be integral with either of the clamping elements, in which case the tongue would be lower so as not to interfere. Alternatively both elements could have flat rear portions, and a separate spacer or shim member, as shown in FIGS. 6 and 7, could be substituted.

Figure 6:
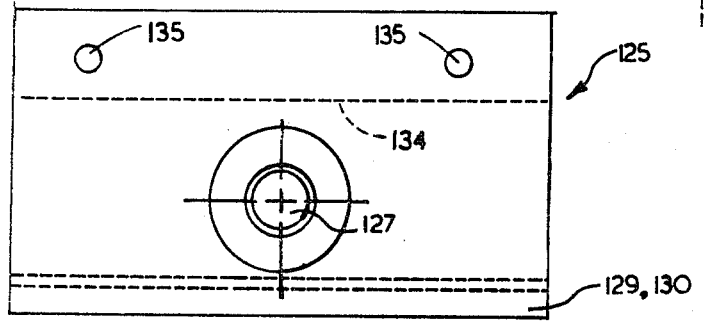
FIG. 6 is a simplified top plan of a second alternative clamping assembly.

FIGS. 6 and 7

A second alternative clamping assembly 125 is simpler than the preferred embodiment shown, both types being adaptable to respective popular forms of holding means used in the bandmill industry. The second alternative assembly 125 is particularly adapted for use in a pocket-type holding means of a saw guide assembly.

The second alternative assembly 125 is considerably shorter than the assembly 50 of FIGS. 2 through 4 and thus a single, centrally located pinch screw 127 only is required. The assembly 125 has discrete first and second clamping elements 129 and 130 which have flat opposed inner faces 131 and 132 respectively. The elements are spaced apart by a separate or discrete spacer member 134 fitted adjacent and between rear portions of the element. Two spaced dowels 135 extend through aligned openings adjacent rear portions of the elements, and also through openings in the spacer member 134. The spacer member can be a shim or other flat member and thus serves as the spacer means and is equivalent to the projection or step as previously described. Clearly separate spacers of differing thicknesses and also different shapes can be substituted to space the elements apart to accept guide blocks of different thicknesses. The dowels 135 fitted in the aligned complementary passages of the element and the spacer serve as alignment means as before.

When fitted with an appropriate guide block, the clamping assembly 125 is similarly directly substitutable for a prior art guide block and the assembly is similarly adaptable to the variations described above. In FIGS. 2 through 4, the wearing faces of the guide blocks are shown to be square to the clamp axis, but this is not necessary and an obliquely inclined wearing face of the block is acceptable to the clamping means of the present invention. In such a structure, and in the other structures described, it is noted that the engaging surfaces of the block are formed into a dovetail section when viewed within a plane perpendicular to the wearing face of the block, ie. as viewed looking "through" the dovetail section of the clamping assembly.

I claim:

1. A clamping assembly for clamping a guide block of wearable material therein, the block having first and second engaging surfaces adjacent an inner face thereof, and an outer face remote from the inner face to serve as a wearing surface to bear against a wearing element of a machine, the clamping assembly and block being received in a holding means of the machine for location adjacent a machine datum surface, the clamping assembly being characterized by:
   (a) a first clamping element having front and rear portions, the front portion having a first gripping and bearing surface for engaging the first engaging surface of the block,
   (b) a second clamping element having front and rear portions, the front portion having a second gripping and bearing surface for engaging the second engaging surface of the block,
   (c) spacer means cooperating with the respective rear portions of the first and second clamping elements to maintain a gap between portions of the clamping elements,
   (d) complementary alignment means adjacent the spacer means and cooperating with the first and second clamping elements to maintain the clamping elements in alignment with each other and with the block,
   (e) clamp means disposed remotely from the spacer means for applying a clamping force to the clamping elements and thence to the block so that the force deflects the second clamping element toward the first clamping element to narrow the gap therebetween.

2. A clamping assembly as claimed in claim 1, wherein the first and second clamping elements are axially elongated blocks, and the spacer means is characterized by:
   (a) one element having an axially extending projection adjacent the rear portion thereof and contacting an adjacent complementary portion of the remaining element.

3. A clamping assembly as claimed in claim 1, wherein the complementary alignment means is characterized by:
   (a) the first and second clamping elements having complementary dowel and passage means spaced along the rear portions thereof to locate the clamping elements relative to each other.

4. A clamping assembly as claimed in claim 3 in which the complementary alignment means are further characterized by:
   (a) the rear portions of the clamping elements each having at least two spaced parallel passages, the passages on one rear portion being positioned so as to be aligned with the passages of the remaining rear portion,
   (b) at least two dowels located in the passages in the clamping elements to locate the elements in desired relationship.

5. A clamping assembly as claimed in claim 1, wherein the clamp means is characterized by:
   (a) a screw threadedly engaging one clamping element and having a head with a bearing surface for applying force to the other clamping element.

6. A clamping assembly as claimed in claim 1 further characterized by:
   (a) the first clamping element has a thickness less than the second clamping element, the second clamping element thus providing a datum face for the clamping assembly,
so that the first clamping element is effectively cantilevered relative to the second clamping element.

7. A clamping assembly as claimed in claim 1 in which:
   (a) two of the engaging surfaces of the block are inclined to each other and formed in dovetail section when viewed within a plane perpendicular to the wearing face of the block,
   (b) the bearing and gripping surfaces of the clamping elements are generally complementary to and mate with the inclined surfaces of the dovetail for applying clamping forces and inward drawing forces on the block.

8. A clamping assembly as claimed in claim 7 in which:

(a) the dovetail section has a central axis disposed normally to the wearing face of the block and at least one of the gripping and bearing surfaces of the clamp is inclined to the central axis of the dovetail section at an angle of between 5 and 60 degrees.

9. A clamping assembly as claimed in claim 8 in which:

(a) the first clamping element has a thickness less than the second clamping element, (b) the second clamping element has a datum face disposed parallel to the dovetail section axis for location adjacent the machine datum surface.

10. A clamping assembly as claimed in claim 1, wherein the complementary alignment means is characterized by:

(a) the first and second clamping elements having complementary tongue and groove means spaced along the rear portions thereof to locate the clamping elements relative to each other.

11. A clamping assembly as claimed in claim 1 further characterized by:

(a) the spacer means being a discrete spacer member fitted between opposed rear portions of the clamping elements and having a thickness to space the clamping elements apart.

* * * * *